United States Patent [19]

Kramer

[11] 4,080,354

[45] Mar. 21, 1978

[54] THERMOPLASTIC POLYESTER RESIN COMPOSITIONS

[75] Inventor: Morton Kramer, Pittsfield, Mass.

[73] Assignee: General Electric Company, Pittsfield, Mass.

[21] Appl. No.: 720,422

[22] Filed: Sep. 3, 1976

Related U.S. Application Data

[63] Continuation of Ser. No. 320,629, Jan. 2, 1973, abandoned.

[51] Int. Cl.$^2$ .............................................. C08L 67/02
[52] U.S. Cl. .................................... 260/40 R; 260/873
[58] Field of Search ............................. 260/873, 40 R

[56] References Cited

U.S. PATENT DOCUMENTS 3,644,574  2/1972  Jackson et al. ...................... 260/873

Primary Examiner—Sandra M. Person
Attorney, Agent, or Firm—Morgan, Finnegan, Pine, Foley & Lee

[57] ABSTRACT

Normally rigid thermoplastic compositions comprising a poly(butylene terephthalate) and a second resinous component which contains from 1 to 40 wt.% of its repeating units comprised of a vinyl aromatic monomer are readily processable and form molded articles characterized by excellent surface appearance and outstanding physical properties. Illustrative embodiments having high resistance to distortion by heat comprise poly(butylene terephthalate) and from 5 to 35 wt.% of a second resinous component comprising 24 and 38 wt.% of styrene units and 76 and 62 wt.% of propylene units and butadiene units, respectively.

8 Claims, No Drawings

THERMOPLASTIC POLYESTER RESIN COMPOSITIONS

This is a continuation, of application Ser. No. 320,629 filed Jan. 2, 1973 and now abandoned.

The present invention is concerned with thermoplastic polyester compositions. More particularly, it relates to compositions of polyesters with a second resinous component containing 1 to 40% by weight of vinyl aromatic units, and correspondingly from 60 to 99% by weight of its units of a non-aromatic type. Such compositions provide advantages in economy in manufacture, improved processability and enhanced physical properties, and may also be provided in reinforced embodiments.

BACKGROUND OF THE INVENTION

High molecular weight linear thermoplastic polyesters, such as polymeric 1,4-butylene glycol terephthalates, have been widely used in films, fibers and, more recently, in moled articles because they crystallize very rapidly from the melt. The resins may also consist of mixtures of poly(1,4-butylene terepthalate) with minor amounts, e.g., from 0.5 to 2% by weight, of copolyesters or mixed esters having units derived from aliphatic or aromatic dicarboxylic acids other than terephthalic acid and/or aliphatic polyols, e.g., 1,2-and 1,3-glycols, other than 1,4-butanediol. All such polyesters can be made following the teachings of Whinfield, U.S. Pat. No. 2,485,319 and Pengilly, U.S. Pat. No. 3,047,539, suitably modified, if necessary. Poly(1,4-butylene terephthalate) is also commercially available.

When used in molding resins, the polyesters of the above type have outstanding surface gloss and high impact strengths and other physical properties.

In the present state of the art, it is known that the stiffness and impact strengths or such polyesters can be somewhat improved if they are blended with a vinyl aromatic polymer having a high aromatic unit content, prior to molding. It is specifically reported that these improvements can only be obtained if the aromatic units in the second resin component comprise greater than 50 wt.% and preferably 100% by weight of the monomer units in the second component. Although such compositions are also known to be improved in strength by adding reinforcements such as glass, the resistance to distortion by heat, and the impact properties are not as high as would be desirable.

In view of this state of the art, it has now unexpectedly been found that compositions comprising poly(1,4-butylene terephthalate) and a second resinous component in which the content of vinyl aromatic units is deliberately held below 50 wt.% and specifically in the range of 1 to 40 wt.% have superior physical properties, particularly retention of resistance to heat distortion. Moreover, the addition of such resinous components raises the already high impact strength of the polyester component. Moreover, this discovery carries through into such compositions which also are reinforced with materials such as glass fibers. In all cases the compositions process in a superior fashion during compounding and have outstanding moldability in conventional equipment.

The above results are particularly surprising because the prior art has repeatedly emphasized the need to insure that any second, resinous component to be used with a polyester resin, contains no less than 50% by weight of vinyl aromatic units.

DESCRIPTION OF THE INVENTION

According to the present invention, there are provided normally rigid thermoplastic compositions comprising
a. from about 1 to 99 parts by weight of a poly(1,4-butylene terephthalate) or a copolyester thereof with a minor amount of an aliphatic or aromatic dicarboxylic acid or an aliphatic polyol and
b. from about 99 to 1 parts of a second resinous component comprising
   i. from 1 to 40% by weight of units of the general formula

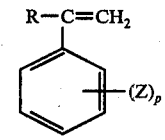

wherein R is a hydrogen or an alkyl group of from 1 to 6 carbon atoms and Z is halogen, vinyl, alkyl of from 1 to 6 carbon atoms or phenyl and $p$ is 0 or a whole number of from 1 to 5 and
   ii. from 99 to 60% by weight of units of a monomer selected from mono-olefins of from 2 to 8 carbons atoms, dienes of from 4 to 8 carbon atoms, alkyl esters of acrylic acid and methacrylic acid having from 1 to 6 carbon atoms in the alkyl group, acrylonitrile, methacrylonitrile, maleic anhydride and vinyl acetate.

Also contemplated by the present invention are a family of resinous compositions as defined above which also include a reinforcement. Preferred reinforcements are selected from reinforcing metals, ceramics, silicates, quartz, glass and carbons.

The poly(butylene terephthalate) resins used in component (a) can be made following the teachings of the patents mentioned above. Among the units which can be present in the poly(butylene terephthalate) copolyester resins are: aliphatic dicarboxylic acids, e.g., of up to about 50 carbon atoms, including cycloaliphatic, straight and branched chain, acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from atomatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including ethylene glycol, propylene glycol, glycerol, cyclohexanediol, and the like. Such copolyesters can be made by techniques well known to those skilled in the art.

Illustratively, polyesters with sufficiently high molecular weight for use as component (a) in this invention will have an intrinsic viscosity of at least 0.2 and preferably about 0.4 deciliters/gram as measured in o-chlorophenol, q 60/40 phenoltetrachloroethane mixture or a similar solvent at 25°–30° C. The upper limit is not critical, but it will generally be about 2.5 dl./g. Especially preferred polyesters will have an intrinsic viscosity in the range of 0.5 to 1.3.

The second resinous component (b) will have from 1 to 40 wt.% of its units of the vinyl aromatic type, and from 99 to 60% by weight of the repeating units of a second monomer as defined above. The second component, (b), can be in the form of a copolymer, a block polymer, a graft polymer, or a mixture of polymers. A particularly preferred component (b) will have its vinyl aromatic units in the form of styrene units, either as a homopolymer of styrene or a rubber modified high impact styrene resin, and the non-vinyl aromatic units in the form of propylene units alone or with butadiene units.

As has been mentioned a preferred class of compositions will comprise the polyester component (a) and the second resinous component (b) and a reinforcing amount of a reinforcing filler. In general, any reinforcement can be used, e.g., fibers, whiskers or platelets of metals, e.g., aluminum, iron or nickel, and the like, and non-metals, e.g., ceramics, carbon filaments, silicates, asbestos, $TiO_2$ and titanate whiskers, quartz, glass flakes and fibers and the like. It is to be understood that, unless the filler adds to the strength, stiffness and impact strength of the composition of polyester component (a) and second resinous component (b), it is only a filler and not a reinforcing filler as contemplated herein.

Although it is only necessary to have at least a reinforcing amount of the reinforcement present, in general, the combination of polyester component (a) and resinous component (b) will comprise from about 20 to about 99 parts by weight and the filler will comprise from about 1 to about 80% by weight of the total composition (i.e., the combined weights of components (a) and (b) and the reinforcement).

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass fliaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (⅛) inch.

In general, best properties will be obtained if the sized filamentous glass reinforcement comprises from about 1 to about 80% by weight based on the combined weight of glass polyester component (a) and resinous component (b), and preferably from about 5 to about 50% by weight. Especially preferably the glass will comprise from about 10 to about 40% by weight based on the combined weight of glass and resins. Generally, for direct molding use, up to about 60% of glass can be present without causing flow problems. However, it is useful also to prepare the compositions containing substantially greater quantities, e.g., up to 70-80% by weight of glass. These concentrates can then be custom blended with blends of resins that are not glass reinforced to provide any desired glass content of a lower valve.

The method of blending the compositions of this invention is not critical and can be carried out by conventional techniques. One conventional method comprises blending the polyester and second resinous component in powder or granular form, extruding the blend and comminuting into pellets or other suitable shapes. Alternatively, the components can be mixed on heated rollers, or in a Banbury-type mixer, by mixing solutions of the components, then removing the solvents, and the like.

The reinforcements and other additives are added in any usual manner, e.g., by dry mixing or by mixing in the melted state in an extruder, or on a heated mill or in other mixers.

By way of illustration, in reinforced embodiments, glass roving (a bundle of strands of filaments) is chopped into small pieces, e.g., ⅛ to 1 inch in length, and preferably less than ¼ inch in length and put into an extrusion compounder with the polyester resin component, and the second resinous component (b), along with stabilizers and any other conventional additives, to produce molding pellets. The fibers are shortened and predispersed in the process, coming out at less than 1/16 inch long. In another procedure, glass filaments are ground or milled to short lengths, and are mixed with the polyester resin and second resinous component and any convention additive(s), by dry blending, then the mixture is either fluxed on a mill and ground, or it is extruded and chopped. In still another procedure continuous lengths of glass rovings are drawn through a bath of melted polyester resin and second resinous component, containing any desired conventional additive(s), in an extruder, which procedure coats the filaments, and then the resin-coated glass strand is comminuted into pellets to form a molding compound. The glass fibers can also be mixed with resin and additives and directly molded, e.g., by injection molding or transfer molding techniques.

It is always very important to thoroughly free all of the ingredients, the polyester resin, the second resinous component, the reinforcing filler, if present, and any other additive(s), from as much water as possible.

In addition, compounding should be carried out to insure that the residence time in the machine is short; the temperature is carefully controlled; the frictional heat is utilized; and an intimate blend between the resins and any additive(s) is obtained.

Although it is not essential, best results are obtained if the ingredients are precompounded, pelletized and then molded. Precompounding can be carried out in conventional equipment. For example, after carefully pre-drying the polyester resin, the second resinous component (b) and other additives, if present, and the reinforcement, if present, e.g., under vacuum at 100° C. for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and any additives at the feed port and reinforcement, if present, down stream. In either case, a generally suitable machine temperature will be about 300° to 600° F.

The precompounded composition can be extruded and cut up into molding compounds, such as conventional granules, pellets, etc., by standard techniques.

The compositions can be molded in any equipment conventionally used for reinforced thermoplastic compositions. For example, good results will be obtained in an injection molding machine, e.g., of the Newbury type, with conventional cylinder temperatures, e.g., 500° F. and conventional mold temperatures, e.g., 150° F. If necessary, depending on the molding properties of the second resinous component, and the amount of the reinforcing filler, if present, those skilled in the art will be able to make the conventional adjustments in molding cycles to accommodate the composition.

DESCRIPTION OF THE PREFERRED EMBODIMENTS

The following examples illustrate the invention. They are set forth as further description, but are not to be construed as limiting the invention thereto.

EXAMPLES 1 and 2

The following ingredients are dried:

poly(1,4-butylene terephthalate), intrinsic viscosity 0.7 dl./g., melting point about 225° C.;
rubber modified high impact polystyrene, Foster Grant Company, FG-834, comprising a graft copolymer of styrene and 9% by weight of polybutadiene rubber in the backbone;
polypropylene, Novamont Company, F-080-PP; and fibrous glass reinforcement, ⅛ inch.

The dry blends are precompounded at 480° F. by passing them through a 1 inch Wayne-type single screw extruder. The screw has a long transition section to insure proper melting. The extrudate is pelletized and the pellets are injection molded at 480° F. (mold, 150° F.) into ASTM type test bars in a 3 oz. Newbury machine. The test bars are tested for the following physical properties: Impact strength, ASTM D-256 and heat distortion temperature ASTM D-648. For comparison purposes, one composition (1A) is made omitting the styrene resin and the polypropylene, and a second (1B) is made with 54 wt.% polystyrene in the resinous component comprising polystyrene, butadiene rubber and polypropylene. The results obtained are set out in Table 1:

Table 1:

| | Compositions of Poly(butylene terephthalate) and a Styrene resin - Polypropylene Component, Glass Reinforced | | | |
|---|---|---|---|---|
| Examples | 1A* | 1 | 2 | 1B** |
| Ingredients (parts by weight) | | | | |
| poly(1,4-butylene terephthalate) | 70 | 56 | 56 | 56 |
| butadiene rubber modified high impact polystyrene resin | — | 5 | 10 | 20 |
| polypropylene | — | 14 | 14 | 14 |
| fibrous glass reinforcement | 30 | 30 | 30 | 30 |
| Composition (percent by weight)*** | | | | |
| (PS+PP+PBD/PS+PP+PBD+PBT) × 100 | — | 25.4 | 30 | 38 |
| (PS/PS+PP+PBD) × 100 | — | 24 | 37.8 | 53.5 |
| Properties | | | | |
| Heat distortion temp., ° F., at 264 psi. | 403 | 386 | 363 | 350 |
| Notched Izod impact strength ft.-lbs./in. | 1.7 | 1.9 | 1.8 | 1.8 |

*Control.
**"High styrene-modified" -- for comparison purposes - outside scope of present invention.
***(a) (PS+PP+PBD/PS+PP+PBD+PBT) × 100 -- weight percentage of vinyl aromatic polymer component in total resinous fraction wherein PS is polystyrene, PP is polypropylene, PBD is polybutadiene and PBT is poly(butyleneterepthalate).
(b) (PS/PS+PP+PBD) × 100 -- weight percentage of vinyl aromatic units in vinyl aromatic resinous component, PS, PP and PBd being as defined.

The data in Table 1 demonstrate that in comparison with the composition containing only polyester and glass, the compositions containing a second resinous component, namely a rubber modified polystyrene resin and a polypropylene resin have higher toughness, as shown by an increase in the impact strength. In addition, if the amount of styrene units in the resinous component PS/PS+PP+PBD is kept were below 50% and especially below 40% by weight, the impact strength is superior in one instance, and the heat distortion temperature is maintained in a commerically acceptable range.

EXAMPLES 3 to 4

The procedure of Examples 1 and 2 is repeated, omitting the glass reinforcement. The formulations are summarized in Table 2.

Table 2:

| | Compositions of Poly(butylene terephthalate) and a Styrene Resin - Polypropylene Component | |
|---|---|---|
| Examples | 3 | 4 |
| Ingredients (parts by weight) | | |
| poly(1,4-butylene terephthalate) | 80 | 80 |
| butadiene rubber modified high impact polystyrene | 7.2 | 14.3 |
| polypropylene | 20 | 20 |
| Composition (percent by weight)* | | |
| (PS+PP+PBD/PS+PP+PBD+PBT) × 100 | 25.4 | 30 |
| (PS/PS+PP+PBD) × 100 | 24 | 38 |

*For definition -- see footnote to Table 1.

Compositions according to this invention with good impact strength and retention of heat distortion temperature are obtained.

Other modifications of the above examples provide compositions within the scope of this invention.

For example, for poly(1,4-butylene terephthalate), substitute a 98/2 1,4-butylene terephthalate-1,4-butylene isophthalate copolyester, a 99/1 1,4-butylene terephthalate-1,4-butylene adipate copolyester or a 98/2 1,4-butylene terephthalate-glycerol terephthalate copolyester.

For polypropylene, substitute polyethylene, polybutene-1, poly(4-methylpentene), polybutadiene, poly(methyl methacrylate), poly(ethylacrylate), polyacrylonitrile, polymethacrylonitrile, poly(vinyl acetate).

For the rubber modified high impact polystyrene, substitute styrene homopolymer, poly(alpha-methylstyrene), poly(4-chlorostyrene), poly(ethylvinylbenzene) a copolymer of styrene and acrylonitrile, a copolymer of styrene and methyl methacrylate, a copolymer of styrene and maleic anhydride, a block copolymer of styrene and butadiene, and a graft copolymer of styrene onto a rubber butadiene-styrene copolymer backbone.

For the glass fiber reinforcement, substitute as reinforcements: aluminum powder, asbestos fibers, silicate, bronze powder, ceramic fibers, titanate fibers, quartz and carbon black.

Because of their excellent physical, mechanical, chemical, electrical and thermal properties, the compositions of this invention have many and varied uses. They may be used alone as molding powders or mixed with other resins and may contain additional, non-reinforcing fillers, such as wood flour, cloth fibers, clays and the like, as well as pigments and dyes, stabilizers, plasticizers and the like.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A normally rigid thermoplastic composition comprising
   a. from about 1 to 99 parts by weight of a poly(1,4-butylene terephthalate) or a copolyester thereof with a minor amount of an aliphatic or aromatic dicarboxylic acid or an aliphatic polyol and
   b. from about 5 to 35 parts of a resinous component comprising
      i. from 1 to 40% by weight of units of the general formula

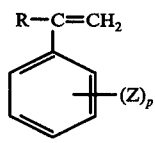

wherein R is hydrogen or an alkyl group of from 1 to 6 carbon atoms and Z is halogen, vinyl, alkyl of from 1 to 6 carbon atoms or phenyl and $p$ is 0 or a whole number of from 1 to 5 and
      ii. from 99 to 60% by weight of units of monomers selected from mono-olefins of from 2 to 8 carbon atoms, dienes of from 4 to 8 carbon atoms, alkyl esters of acrylic acid and methacrylic acid having from 1 to 6 carbon atoms in the alkyl group, acrylonitrile, methacrylonitrile, maleic anhydride and vinyl acetate and
   c. from 1 to 80% of fibrous glass based on the combined weight of (a), (b) and fibrous glass.

2. A composition as defined in claim 1 wherein, in resinous component (b), repeating units (i) comprise styrene units and repeating units (ii) comprise propylene units.

3. A composition as defined in claim 1 wherein, in resinous component (b), repeating units (i) comprise styrene units and repeating units (ii) comprise propylene units and butadiene units.

4. A composition as defined in claim 1 wherein said reinforcement is filamentous glass, in an amount of from 10 to 40% by weight based on the combined weights of components (a) and (b) and (c).

5. A composition as defined in claim 4 wherein, in resinous component (b), repeating units (i) comprise styrene units and repeating units (ii) comprise a major proportion of propylene units and a minor proportion of butadiene units.

6. A normally rigid thermoplastic composition which comprises:
   a. from about 1 to 99 parts by weight of poly(1,4-butylene terephthalate); and
   b. from about 5 to 35 parts by weight of a resinous component which comprises:
      i. from 1 to 40% by weight of rubber modified high impact polystyrene
      ii. from 99 to 60% by weight of polypropylene; and
   c. fibrous glass in an amount of from 1 to 80% by weight based on the combined weight of components (a), (b) and the fibrous glass.

7. A composition as defined in claim 6 wherein component (a) comprises 56 parts by weight of poly(1,4-butylene terephthalate), component (b) comprises 5 parts by weight of butadiene rubber modified high impact polystyrene resin and 14 parts by weight of polypropylene and component (c) comprises 30 parts by weight of fibrous glass.

8. A composition as defined in claim 7 wherein component (a) comprises 56 parts by weight of poly(1,4-butylene terephthalate), component (b) comprises 10 parts by weight of butadiene rubber modified high impact polystyrene resin and 14 parts by weight of polypropylene and component (c) comprises 30 parts by weight of fibrous glass.